Figure 1:
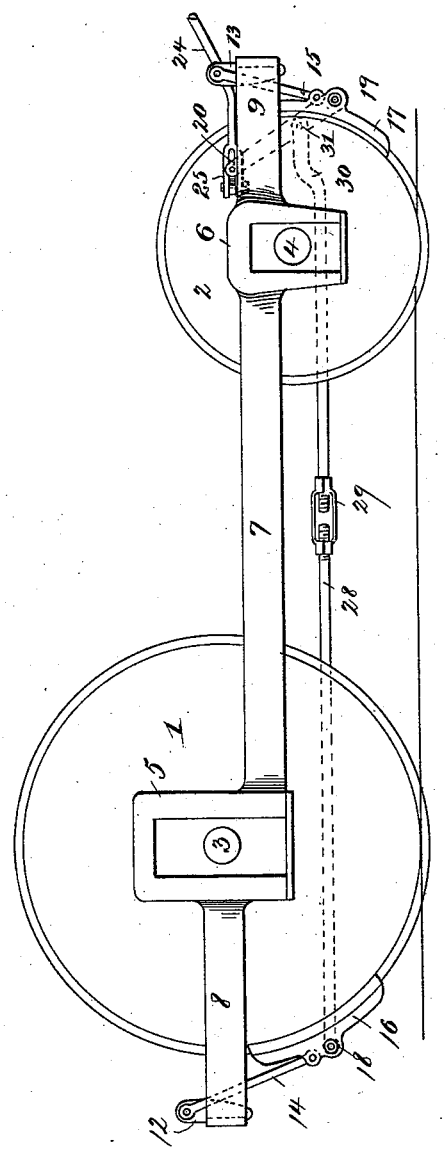

(No Model.) 3 Sheets—Sheet 1.

W. S. ADAMS.
CAR BRAKE.

No. 547,533. Patented Oct. 8, 1895.

Attest:
C. N. Benjamin
Wm Jacobsen.

Inventor.
Walter S. Adams
By Joseph L. Levy
atty.

(No Model.) 3 Sheets—Sheet 2.
W. S. ADAMS.
CAR BRAKE.
No. 547,533. Patented Oct. 8, 1895.
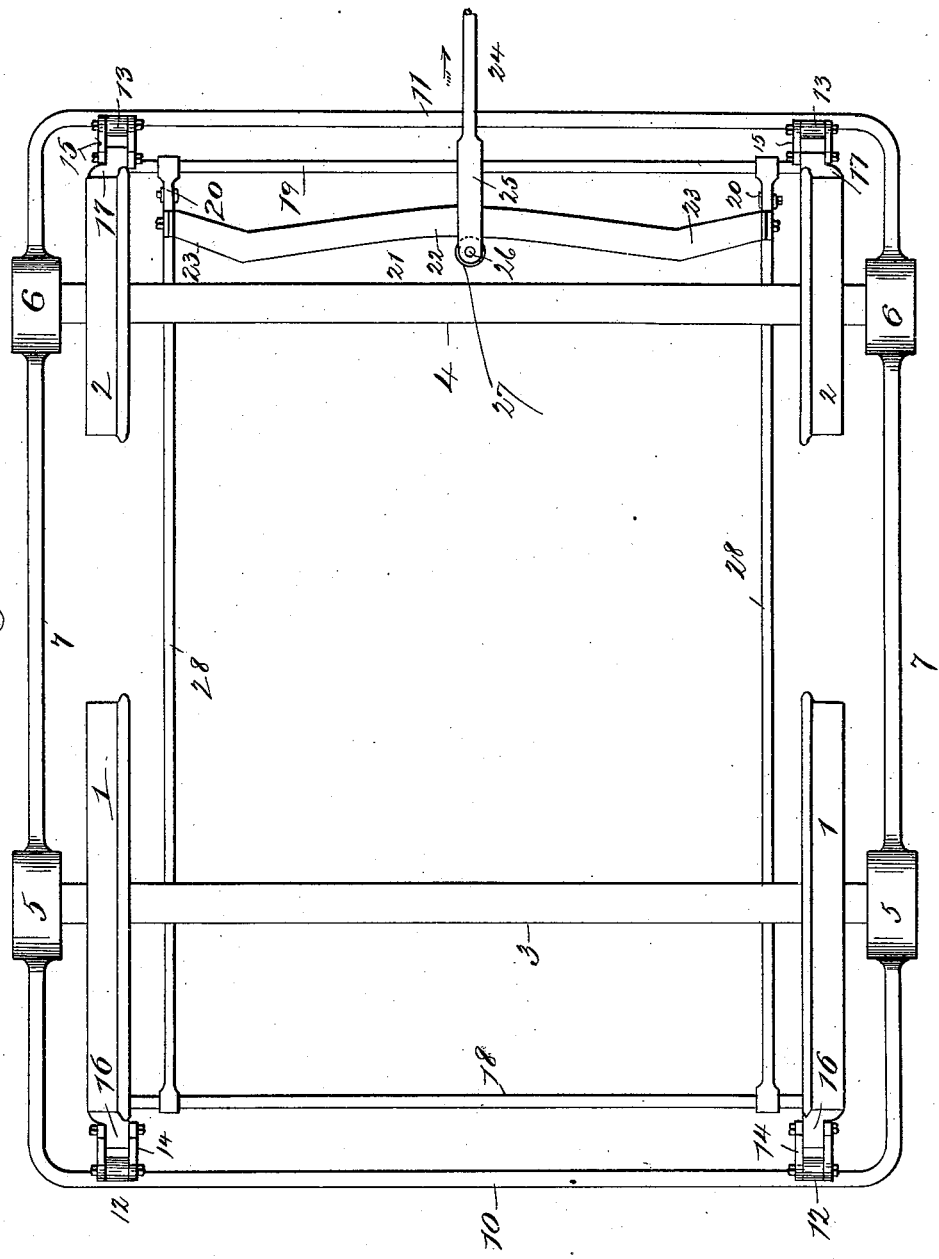

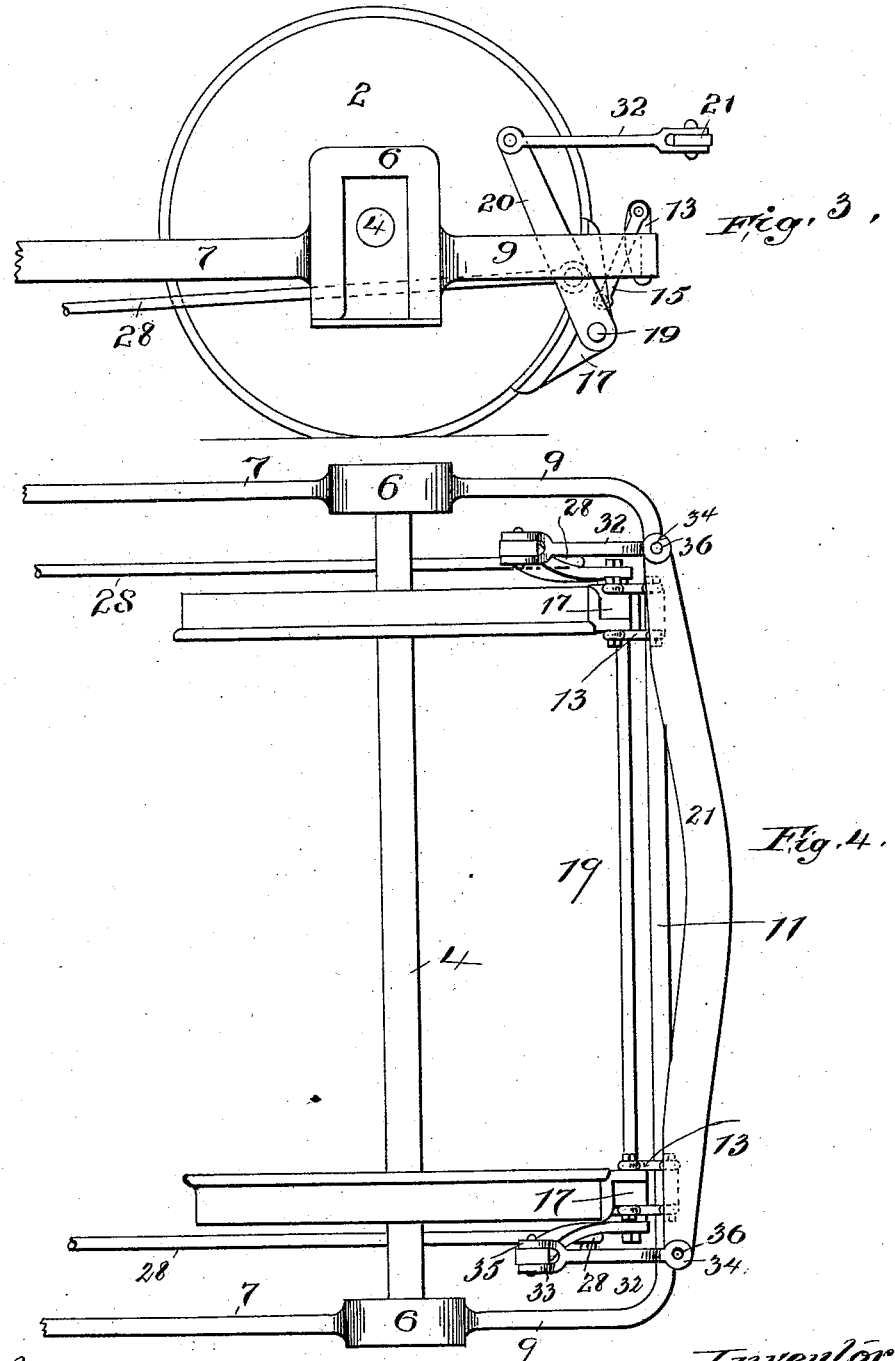

United States Patent Office.

WALTER S. ADAMS, OF PHILADELPHIA, PENNSYLVANIA.

CAR-BRAKE.

SPECIFICATION forming part of Letters Patent No. 547,533, dated October 8, 1895.

Application filed April 25, 1894. Serial No. 508,944. (No model.)

*To all whom it may concern:*

Be it known that I, WALTER S. ADAMS, a citizen of the United States, residing at Philadelphia, in the county of Philadelphia and State of Pennsylvania, have made certain new and useful Improvements in Brake Mechanisms, of which the following is a specification.

My invention has special reference to brake mechanisms used on car-trucks designed for city or suburban traffic, and to pivotal trucks especially, although such mechanism can be readily used in non-pivotal trucks and in other relations.

This specification relates to the subject-matter of an application filed by John A. Brill and myself on the 3d day of January, 1894, Serial No. 495,547.

I have illustrated my brake mechanism in connection with a truck of the class known as "maximum traction-trucks" wherein large and small wheels are used, the brake mechanism having special reference thereto, although said mechanism can be advantageously employed in trucks of other construction.

In the drawings forming part of this specification, Figure 1 is a side elevation, and Fig. 2 a plan view, of a car-truck having my improved brake mechanism applied thereto; Fig. 3, an enlarged side elevation of one end of the truck, showing a slightly-modified structure; Fig. 4, a plan view of Fig. 3.

Similar numerals of reference refer to like parts throughout the several views.

Referring now to Figs. 1 and 2, the numeral 1 indicates the large or driving wheels of the truck, and 2 the trailing-wheels, both having axles 3 and 4 journaled in axle-boxes located within yokes or pedestals 5 and 6, which form part of the axle-box or truck-frame, the yokes being united by the side bar 7, extensions 8 9, and cross-bars 10 11, the whole forming a rectangular frame. This or any other form of frame convenient for supporting my brake mechanism can be used.

The form of truck illustrated herein is designed as a pivotal truck of the maximum-traction class, the pivotal center being located over or adjacent to the axle 3, so that the rear or trailing end of the truck will have a greater amount of radiation in relation to the car-body, or vice versa, than will the forward or driving end, and the brake mechanism is specially designed to permit of this and at the same time to keep the central portion of the truck free and clear for the mounting of the motor or grip frame, and also to permit of the truck-brake mechanism being movably secured to the car-rods within the limits of the truck frame without impairing the operation of the brake mechanism, interfering with the swiveling of the truck, or encroaching upon the free room or space desired between the axles and wheels.

The brake mechanism is organized as follows: At 12 13 are standards or brake-supports secured adjacent to the tread of the wheels 1 2 to the cross-bars 10 11, respectively, from which supports or standards depend pivoted links 14 15 that take onto brake-shoes 16 17 in the usual way and are thus sustained in proximity to the wheels 1 2. Each opposing set of shoes 16 17 is connected together by a brake beam or bar 18 19. From the beam 19 extend upwardly brake-levers 20, which are journaled on said beam and have a slight vibratory movement thereon, the upper ends of both levers being connected at the trailing end of the truck by an equalizing-bar 21, which is made segmental at its central portion 22, the end of the segmental portion being provided with rearwardly-extending arms 23, which permits of the equalizing-bar being secured to the upright levers 20 between the axle 4 and cross-bar 11 without crowding or interference by either the axle or cross bar, and which, furthermore, enables the segmental portion to be provided without increasing the length of the bar. The segmental portion 22 of the bar 21 is movably connected with a draw-bar or brake-rod 24, which in this class of truck leads from the levers pivotally secured to the floor of the car, and which move with the car on rounding curves, (or such bar can be directly connected with the windlass or other operating mechanism on the car body,) the end of the bar 24 being bifurcated, as at 25, through the forks of which the bar 22 passes, the end of the forks carrying a short spindle 26, on which a roller 27 is journaled and engages the segmental portion of the equalizing-bar 21, and which permits of the truck or car swiveling one in relation to the other and the connection between the prime-operating mechanism and the brake mechanism to be maintained and a central line of draft to be preserved during all of the evolutions of the truck and car while rounding curves, and furthermore permits the connection of the primary operating device with the truck-brake mechanism to be had within the truck itself without interference.

The brake-beams 18 and 19 are connected together by the brake-rods 28, the rods lying close to the inner sides of the wheels and below the axles, and said rods may be provided with turnbuckles 29, Fig. 1, to regulate their length. The rods at the rear end may be provided with a goose-neck 30, which allows for the connection of said rods with the upright brake-levers 20 between the connection of the equalizing-bar thereto and the brake-beam 19 at any point in the length of said rods, so as to increase or decrease the power to be applied through said levers.

In operation when the bar 24 is pulled in the direction of the arrow, Fig. 2, the upright levers 20 will be vibrated in the same direction upon the beam 19 as a fulcrum, drawing the brake-rods 28 in that direction, swinging the brake-shoes 16 to the tread of the wheel, the shoes 17 then following and being forced against the tread of the wheel 2 in a like manner. The mechanism can be provided with a spring secured to the cross-bars in the usual way for retracting the brake-shoes when the applying power is freed.

In Figs. 3 and 4 a slightly-modified construction is shown, in which the upright brake-levers are shown secured to the brake-beam 19 on the outside of the shoes and wheels, and their upper ends connected by a segmental equalizing-bar not having the angle portions 23, such connection, however, being made through the intervention of short parallel links 32, having forked ends 33 34, to which both the equalizing-bar and upright rods are pivotally secured by the pins 35 36.

All of the other connections are the same as heretofore described.

The equalizing-bar in this case, apart from the height which it extends above the cross-bar 11, is so located for the purpose of enabling the brake-rods 28 to be located outside of the wheels when the space within them and between the axles is insufficient for the location of the motor it supports or a grip-frame, and which forms a very convenient method of securing the upright brake-levers to the equalizing-bar.

It is evident that the details of construction and the arrangement of parts may be altered or changed without departing from the spirit of my invention.

Having described my invention, I claim—

1. In a brake mechanism, the combination of brake shoes, means for pivotally supporting the shoes, upright brake levers fulcrumed to said shoes, brake rods connecting the intermediate portions of said upright levers with the opposing shoes, and means for vibrating said upright levers, substantially as described.

2. In a brake mechanism, the combination with the brake shoes, means for pivotally supporting them, brake beams connecting said shoes in pairs, upright brake levers secured at their ends to one of said brake beams, brake rods secured to the opposing brake beam at one end and to the intermediate portion of said upright levers at their other ends, and means for vibrating said upright levers secured thereto above the connection of the brake rods, substantially as described.

3. In a brake mechanism, brake shoes, means for pivotally supporting them, brake beams connecting said shoes in pairs, upright levers fulcrumed on one of said brake beams, brake rods secured at one end to the opposing brake beam and to the upright levers at their other ends above their fulcra, an equalizing bar connecting the upper ends of said levers, and means for operating said equalizing bar movably secured thereto, substantially as described.

4. In a brake mechanism, brake shoes, means for pivotally supporting said shoes, brake beams connecting said shoes in pairs, levers fulcrumed at one end directly on one of said beams, and rods connected at one end with the opposite beam, said rods having a goose neck 30 at the other end for connection with said levers above the fulcrum of the levers and plane of the beam, substantially as described.

5. In a brake mechanism, brake shoes, pivotal supports therefor, brake beams connecting the shoes, upright levers fulcrumed on one of said beams, said shoes being arranged in opposing pairs, rods connecting said levers with the opposing pair of shoes, and an equalizing lever connecting the tops of the upright levers, substantially as described.

6. In a brake mechanism, brake shoes connected in pairs by beams, pivotal supports for said shoes, upright levers fulcrumed at one end on one of said beams, rods extending from the intermediate portions of said levers to the other pair of brake shoes, and an equalizing lever connecting said upright levers above the rods, substantially as described.

7. The combination of a pair of brake shoes, levers pivoted at their ends thereto, links at the upper ends of said levers, and an equalizing lever or bar connecting said links, with rods pivotally connected with said levers at a point between the ends of said levers and their point of connection with the shoes, and another pair of shoes pivotally connected with said rods, all arranged, substantially as described.

Signed at Philadelphia, in the county of Philadelphia, in the State of Pennsylvania, this 27th day of March, 1894.

WALTER S. ADAMS.

Witnesses:
R. S. REED,
R. S. HOAGLAND.